(No Model.) 2 Sheets—Sheet 1.
C. A. SMITH.
RAILWAY CAR.
No. 524,355. Patented Aug. 14, 1894.
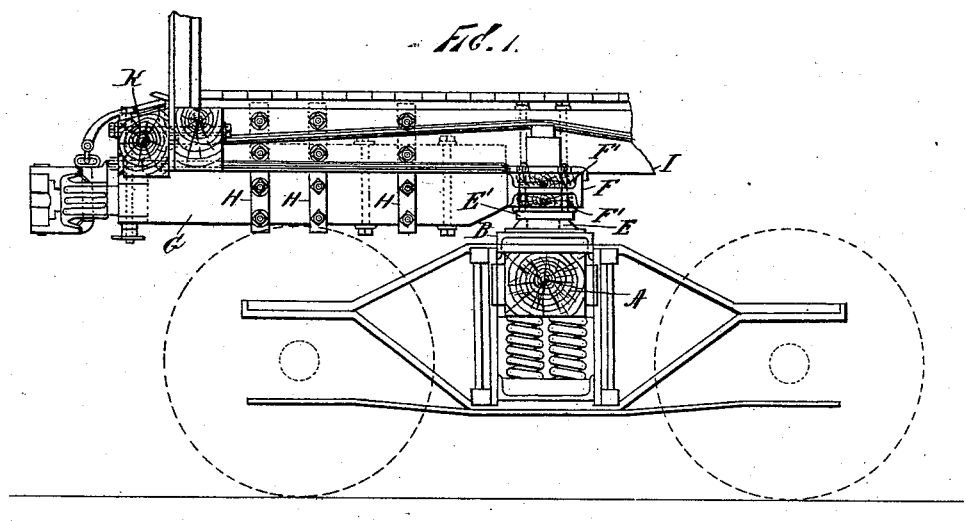
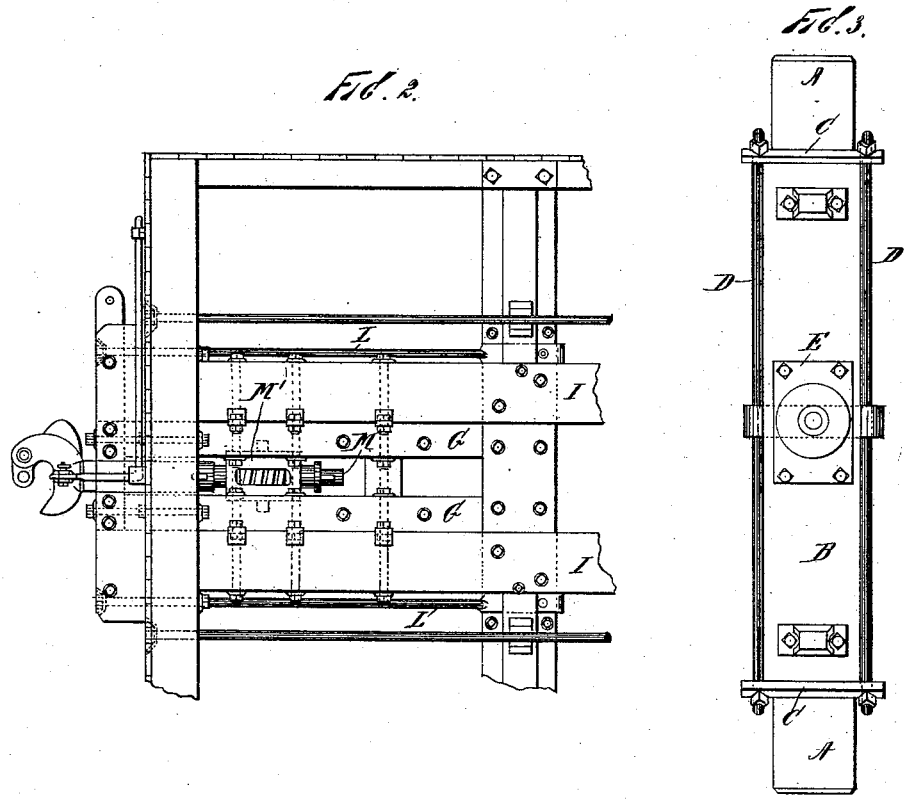
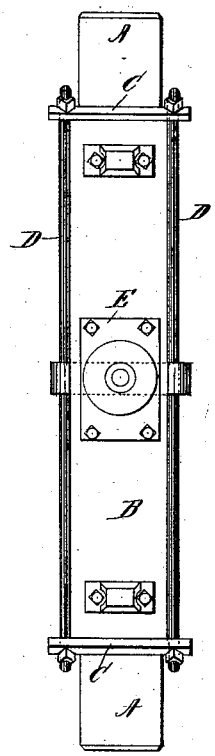

(No Model.) 2 Sheets—Sheet 2.
C. A. SMITH.
RAILWAY CAR.
No. 524,355. Patented Aug. 14, 1894.
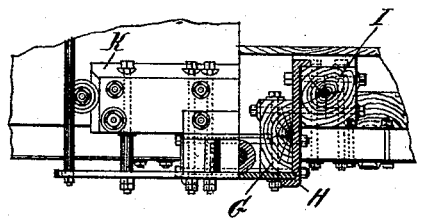
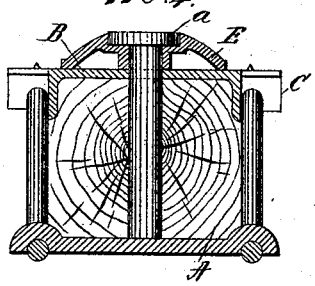
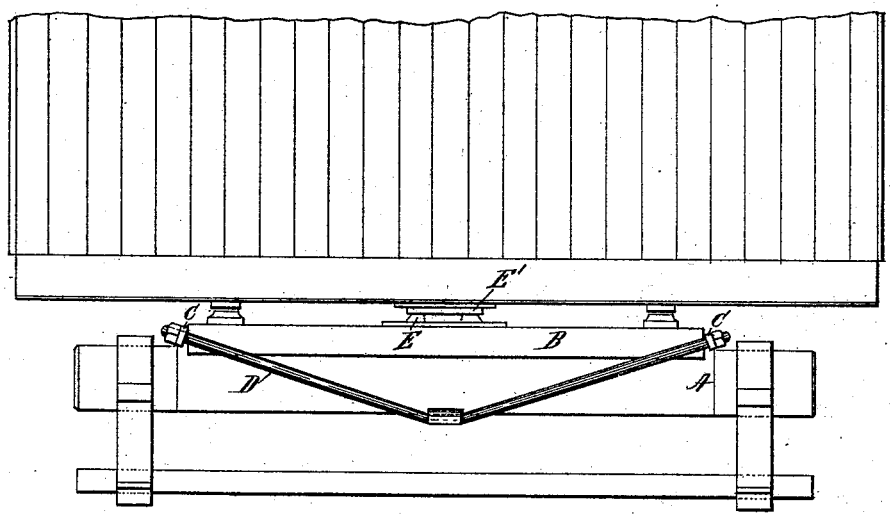

UNITED STATES PATENT OFFICE.

CALVIN A. SMITH, OF EAST ORANGE, NEW JERSEY, ASSIGNOR OF TWO-THIRDS TO JOHN A. HILL, ANGUS SINCLAIR, FRANK W. COOLBAUGH, AND LEWIS R. POMEROY, OF SAME PLACE.

RAILWAY-CAR.

SPECIFICATION forming part of Letters Patent No. 524,355, dated August 14, 1894.

Application filed December 1, 1893. Serial No. 492,461. (No model.)

*To all whom it may concern:*

Be it known that I, CALVIN A. SMITH, of East Orange, county of Essex, and State of New Jersey, have invented certain new and useful Improvements in Railroad-Cars, of which the following is a full, clear, and exact description, reference being had to the accompanying drawings, and to the letters of reference marked thereon.

My invention relates to the construction of railroad cars and especially to the means or appliances by or through which the car body is sustained and moved.

The principal object of my invention is to sustain the car body upon a truck or trucks and to apply the draft rigging in such manner as to effectually withstand all the various heavy shocks and strains incident to the use of the car, and subordinate objects are to render the parts (especially the body bolster) firm and durable, yet as light as is consistent with substantial construction, and easy to be made and mounted, reducing the original cost of construction and effecting a considerable saving in subsequent repairs.

To accomplish all of this and to secure other and further advantages in construction and operation my improvements involve certain new and useful arrangements or combinations of parts and particulars of invention as will be herein first fully described and then pointed out in the claims.

In the drawings, Figure 1 is a partial section and elevation of a portion of a freight car mounted upon a truck, and embodying my improvements. Fig. 2 is a plan view showing the manner of applying the draft timbers. Fig. 3 is a plan showing the top of a truck bolster (on which the body bolster rests) and Fig. 4 is a cross section through the same. Fig. 5 is a front view partly in section and partly in elevation, corresponding with Fig. 1 and showing the manner of sustaining the draft timbers upon the longitudinal timbers of the car body and in connection with the improved body bolster. Fig. 6 is an end view showing a car body mounted on a truck bolster, omitting other parts.

In all the figures like letters of reference, wherever they occur, indicate corresponding parts.

A is the timber of the truck bolster through which the weight of the car and its load is transmitted to the truck. Any approved form of truck may be adopted, the form shown being well adapted for the purposes intended.

B is a channel bar applied upon timber A. It abuts against plates C C which support truss rods D D and thus the truck bolster is made sufficiently strong to withstand all the vertical strains and shocks to which it may be subjected. It is the shocks and strains in other directions than the vertical which are the chief causes of breakages on cars, and against the action of which it is the chief purpose of my invention to oppose a substantial resistance. Say a truck weighing three tons or more is held to the car body by the center plate and pin only,—then it is plain that when one car is thrown against another, the bodies alone are stopped by the contact, and the trucks, continuing on, expend all the force of their momentum on the center pin, giving a powerful blow on the body bolster, first in one direction, then in another, until finally this bolster is broken. To obviate this I construct and mount the body bolster as will be explained below.

Upon the center of the truck bolster is a cap plate or saddle E, recessed as at *a* to receive a projection upon a corresponding plate E', and perforated to admit the center pin.

The body bolster is composed of a steel I beam F, which may be of any width and any depth of flange, and of wooden fillings F' F'. This is bolted to the sills of the car same as if it was an all wood bolster, bolts going through web of I beam. As thus constructed, the body bolster is amply strong to carry the load without trussing, and its width is sufficient to enable it to bear all the buffing strains, the draft timbers being set against it.

The plate E' is secured upon the under side of this bolster so that all the shocks transmitted by it and the center pin are resisted by the bolster. The horizontal shocks are effectually resisted because the width of the web of the I beam is directly opposed to them.

G. G. are the draft timbers which extend back to and abut against the I beam F. These are sustained by three heavy carrying irons H. H. H. which act as keys between draw bar and sill, and of these, one end reaches over the adjacent longitudinal car sill I, and the other end under the draft timber, as best shown in Fig. 5. The timbers G. lie flat against the sills I and are bolted in place by cross bolts, the carrying irons H being let into both timbers so that they (the timbers) may be brought together in the required manner.

The buffer timber K is connected with the draft timbers G. by suitable bolts, and is also connected with the body bolster F. F'. by strong rods L. L. which pass through the buffer timber and reach over the body bolster where they are flattened and bolted to place, being further secured by hooking down at their extremities and against the I beam F as best shown in Fig. 1.

M. is the draw bar, located between the draft timbers, passing through a spring box M' which is firmly anchored to said timbers.

From the construction and arrangement shown and explained, it is plain that the buffing strains or shocks are transmitted to and from the truck and are resisted by pieces and parts amply rigid and well calculated to withstand their greatest effect.

Each end of the car is similarly equipped or constructed, and the improvements are applicable whether double or single trucks are employed.

The parts are simple and easily applied and the improvements well adapted to answer all the purposes or objects of the invention previously set forth.

Having now fully described my invention, what I claim as new, and desire to secure by Letters Patent, is—

1. The body bolster composed of a steel I beam with the web placed horizontally, said beam being provided with top and bottom fillings of wood and bolted to the car body through the web, and also provided with a center plate for resting on the car truck substantially as shown and described.

2. The combination of the body bolster composed of the steel I beam and wood fillings, a truck bolster having a saddle applied thereon, and a center plate mounted under the body bolster and bearing on the saddle, the parts being arranged substantially as shown and described.

3. In combination with the body bolster, draft timbers and buffer timber, the tie rods extending from the buffer timber, reaching over and hooking behind the body bolster, and secured to said bolster by bolts passing through the web thereof, substantially as shown and described.

4. In combination with the draft timbers and central car sills, the carrying irons let into both timbers, said irons being hooked under the draft timbers and over the sills, and the timbers being bolted in contact with each other, substantially as shown and described.

In testimony that I claim the foregoing I have hereunto set my hand in the presence of two witnesses.

CALVIN A. SMITH.

Witnesses:
W. J. MORGAN,
WORTH OSGOOD.